United States Patent [19]
Fernandes

[11] Patent Number: 6,014,135
[45] Date of Patent: Jan. 11, 2000

[54] COLLABORATION CENTRIC DOCUMENT PROCESSING ENVIRONMENT USING AN INFORMATION CENTRIC VISUAL USER INTERFACE AND INFORMATION PRESENTATION METHOD

[75] Inventor: Antonio M. Fernandes, San Jose, Calif.

[73] Assignee: Netscape Communications Corp., Mountain View, Calif.

[21] Appl. No.: 08/833,300

[22] Filed: Apr. 4, 1997

[51] Int. Cl.[7] .............................. G06F 3/14; G06F 15/163
[52] U.S. Cl. .................... 345/331; 345/348; 345/329; 345/349; 345/971; 709/203; 709/227
[58] Field of Search ..................... 345/331, 335, 345/329, 971, 973; 395/682, 200.33, 200.57

[56] References Cited

U.S. PATENT DOCUMENTS

| | | | |
|---|---|---|---|
| 5,214,756 | 5/1993 | Franklin et al. | 345/348 |
| 5,596,697 | 1/1997 | Foster et al. | 345/340 |
| 5,617,539 | 4/1997 | Ludwig et al. | 395/200.35 |
| 5,666,500 | 9/1997 | Roberson | 345/348 |
| 5,717,879 | 2/1998 | Moran et al. | 345/349 |
| 5,781,190 | 6/1996 | Gorbet et al. | 345/335 |

*Primary Examiner*—Raymond J. Bayerl
*Assistant Examiner*—Cuong T. Thai
*Attorney, Agent, or Firm*—Limbach & Limbach L.L.P.

[57] ABSTRACT

A new computer interface displays a plurality of icons representative of people, documents and time. Various functions, including media independent functions, for interacting between these three elements, including composing, routing (collaborative or otherwise), are disclosed.

87 Claims, 6 Drawing Sheets

FIG. 7

| MEDIUM | SENDER | SUBJECT | SENT |
|---|---|---|---|
| | Tony Fernandes | Re:Prototype Usability Test | 6/23/97 |
| | Irene Au | Group Meeting Schedule Change | 6/23/97 |
| | Mike McCuc | One and 97 is 197 | 6/23/97 |
| | Tony Fernandes | Status reports needed | 6/22/97 |
| | FRS Design Corp. | Project Progress | 6/22/97 |
| | Mark Stern | Apple's Grayscale UI specs | 6/21/97 |
| | Front Desk | Your lights are on | 6/21/97 |
| | Knight-Ridder Corp. | Subscribe to Mercury News | 6/23/97 |
| | Unknown @ Location | Group Meeting Schedule Change | 6/23/97 |
| | Product Marketing | Our new Netscape Sales Video | 6/23/97 |
| | Knight-Ridder Corp. | Subscribe to Mercury News | 6/23/97 |
| | Unknown @ Location | Group Meeting Schedule Change | 6/23/97 |

QuickTray Workspaces Agents Offline Storage Recycle Bin HR Dept

HR Dept. News: AAPL NSCP MSFT   A word from our   From: Tony Fernandes 6/23/97
Re: Hiring Frenzy   21 1/2   55   Profit Sharing 02.   "Re: Prototype Usability Testing"

COLLABORATION CENTRIC DOCUMENT PROCESSING ENVIRONMENT USING AN INFORMATION CENTRIC VISUAL USER INTERFACE AND INFORMATION PRESENTATION METHOD

FIELD OF THE INVENTION

The present invention relates to information processing system organization and in particular, to an interactive operator interface to information processing systems. More particularly, the present invention relates to a computing device based information processing system environment that uses a visual user interface for interfacing a user with primitives of people, information and time, as opposed to the prior art interface of using primitives of functions or tasks (such as word processing, spread sheet etc.)

DESCRIPTION OF THE RELATED ART

Today, the typical user of an information processing system such as a personal computer, has little or no training in the computer sciences or even in the basic use of a personal computer. In order to operate a computer effectively, however, he or she must overcome a steep learning curve, one requiring mastery of a number of commands and data formats. One approach to solving this problem is to spend hours laboring over often-cryptic user manuals—an unattractive option at best. Instead, most users usually abandon printed manuals in favor of trial-and-error learning.

To increase ease of use, designers of computer systems have labored for decades to create architectures which are intuitive. Most of this effort has been centered around the user interface (UI)—the means by which a user communicates (i.e., supplies input and receives output) with a computer. With the increasingly widespread availability of powerful microprocessors, graphical user interfaces (GUIs) have become feasible.

A GUI is a type of display format that enables a user to operate a computer by pointing to pictorial representations, such as "windows" and "icons" (bitmaps), displayed on a screen device. A window is typically a rectangle displayed on the screen that affords a user workspace within a program. In typical operation, the user may move the window about on the screen, change its size or shape, enlarge it to fill the screen, close it entirely, or change how much of its contents are displayed. To aid the user in the manipulation of its contents, a window will typically include a number of user interface controls, such as buttons, menus, sliders, and the like. Outside the window, the screen can display other screen objects, such as other windows, disk drive icons, or even a trash can icon.

To navigate within a GUI, most systems employ a screen cursor or pointer, typically displayed as a small arrow icon (bitmap) which allows the user to select individual points on the screen. In operation, the screen cursor is moved to a desired screen location in response to movements of a pointing device (e.g., mouse) by the user. Besides effecting cursor movement, most pointing devices include one or more switches or "mouse buttons" for specifying additional user input or "user events." Since many user choices may be entered through use of a pointing device (e.g., for selecting screen objects), instead of input with a keyboard, the need for the user to memorize special commands has been lessened.

Most GUIs feature a menu bar, for instance, running across the top of the screen which serves to group or categorize commands available to the user. Clicking on an item on the menu bar typically causes a "pull-down" menu to appear. This second or "submenu" also includes a number of items, each of which is associated with a desired action, including the display of even more menus. To select a desired action, the user usually clicks the corresponding menu item with the screen or mouse pointer. For some menu items, particularly those which may be nested in several layers deep, a keyboard equivalent or "hot key" may be available but, unfortunately, these must also be memorized by the user.

With well-known examples including Apple's Macintosh (Mac) interface, Microsoft's Windows, and IBM's OS/2 Presentation Manager, these interfaces simplify computer operation by attempting to provides users with a more-or-less consistent interface across applications. Nevertheless, most application software still requires complex user actions, such as "double-clicking" or "dragging" a mouse device while a key is held down. Thus, there typically exists a plethora of ways to do almost anything in a graphical interface, such as the Mac. While this increases the flexibility of a system, it also adds to the complexity of the interface that the user must master. And this problem is by no means limited just to novice users. Experienced computer users are reluctant to read user manuals and, hence, often fair no better than novice users. All told, the user is still required to memorize special commands.

Standard windowing interfaces depend heavily on a system of pull-down menus. While pull-down menus are an improvement over command-line (e.g., MS-DOS by Microsoft Corporation) interfaces, they are non-metaphoric or non-analogous to ordinary objects, i.e., ones familiar to the user. Perhaps the biggest weakness of pull-down menus is the requirement that the user must know beforehand which menu contains the item or function of interest. If the user does not know which pull-down menu, submenu, or dialog box contains the item he or she is seeking, the user will spend an inordinate amount of time checking the contents of each in an effort to hunt down the needed item. And often the search is in vain. Moreover, since functions for a given object (e.g., text object) are often scattered over several disparate menus, the user is discouraged from interacting and experimenting with the object. Thus, many prior art windowing GUIs are no more intuitive or useful to the user than other menuing systems.

One approach to overcoming this problem has been the implementation of "smart icons." This interface technique employs screen buttons painted with icons which are supposed to tell the user what the buttons do. This approach, however, makes the interface problem even worse because the meaning of the individual buttons is often not easily grasped. For instance, some button images are so small or so numerous that it is hard to see the icons well enough to discern what they mean. Thus, the approach is frequently no more helpful than hiding the desired function deep inside a menuing system. Thus, with advances in computer and software technology, application software has not necessarily become easier to use. Instead, technological advances have been largely employed to build more complex functions into existing applications, often resulting in a complicated user interface, such as a staggering array of icons, which leave the user even more bewildered.

The present invention recognizes that it is highly desirable to provide information processing systems with system and application software which is highly intuitive to users, including those who are untrained in the use of the software. What is needed is a system and interface methods which require little or no knowledge of specific commands by the user. Moreover, such methods should not "invade" the user screen workspace (client area), that is, they should operate in a non-intrusive fashion. The present invention fulfills this and other needs.

The present invention recognizes that present-day implementations of graphical user interfaces often serve to further confuse a user of a computer system. Examples include toolbars or "smart" icons, which, owing to the vast number of bitmap images typically employed, force the user to memorize a multitude of (often arbitrary) images. The present invention further recognizes that most humans process information better visually than they do textually. It is not merely the graphical nature of an interface however, that makes it better. Using a bit-mapped system to render the lines and characters of a character-mode program does not change the essential nature of the program. It is relatively simple to create a program with a "graphical user interface" that has the same extreme difficulty-of-use as a CP/M, DOS, or UNIX application. The qualities that make a user interface good are user-centric and not technology-centric. "Graphicalness" is a technology-centric concept.

The present invention also recognizes that there are two very important user-centric qualities: the "visualness" of the software and the program's vocabulary. Instead of a graphical user interface, what is need is a visual user interface (VUI). In order to realize the advantages of the technology, the interaction with the user must become visual and not merely graphical. In other words, representational graphics are not as important in an interface as is the visualness of the interaction with the interface. What is needed is a VUI that allows the user to visualize how the interface is controlled.

The user-centricness of software also depends on its vocabulary. A command line interface appears to a user to have an unlimited vocabulary. Anything can be entered at the command line. Such an interface burdens the user with learning the vocabulary. In contrast, a menu driven GUI is more user-centric because it limits the vocabulary to a finite set of menu choices. However, the user is still burdened with understanding the options, locating and selecting the desired choice. What is needed is a VUI that does not depend on menus, has a more restricted vocabulary than a menu based system, and allows the user to visualize the process needed to control the system to achieve his goals.

Operators use information processing systems to work collaboratively in networked environments. A multitude of applications and operating systems have been developed to facilitate such collaboration. For example, some of the more significant groupware applications and operating systems that are also GUI-based include: Lotus Notes by Lotus Corporation, MS Windows for WorkGroups by MicroSoft Corporation, Macintosh System 7 by Apple Computer Corporation, X.11 Window System by Robert W. Scheifler and Jim Gettys at the Massachusetts Institute of Technology, and OS/2 Presentation Manager by International Business Machines, Incorporated.

The document is a vehicle for sharing information within a networked information system. The document is currently the single most important vehicle for the transmission of information between people. Information carried within documents can be presented in different forms, most of which can be transposed between various media, e.g. text, graphics, video, audio. All can be transmitted, presented, shared and worked on as digital document files. A Web page is a document in digital format. If emailed, it becomes a document on a different computer in digital format. If downloaded to a floppy, it becomes a document on disc. If printed out, it becomes a hard copy document. If scanned back into a system using optical character recognition (OCR) software, it returns to being an editable document file. The hard copy manuscript of a Mozart Symphony sitting in a Salzburg Museum is a document. A CD of the Vienna Philharmonic playing that symphony is an audio document with the added information of the conductor's interpretation. A video of the performance is yet another document. But all are carrying the same essential information. Only the medium is different and is chosen for the effect the producer wishes to have on the end user. Compound documents include a plurality of different media types. For example, an email message could contain both text and graphics, or a video file could contain an audio sound track and text in the form of subtitles. Essentially, any fixed, reproducible expression of information is a document.

Generally, groupware applications are designed to streamline the collection and dissemination of documents. Users operating in a groupware environment can build on the documents that their co-workers generate. Fostering collaboration in this manner is an emerging way of making groups of individuals more productive as a whole. Groupware applications may include calendars, electronic mail, conferencing, spreadsheets, databases, and word processing. In contrast to the paper-based approach for collaborating on reports, the electronic method, using groupware, accomplishes the task more quickly, more efficiently, and without the drawbacks associated with paper, because documents can be updated immediately, eliminating the need for users to replicate each other's efforts.

A frequent and persistent problem with groupware applications and environments however, is that each application or environment has its own, different paradigm of how users should interface with data. In other words the vocabularies of the different programs are not restricted and contain different redundant controls for the same functions. The drawback is that users are required to learn and adapt to each program's unique interface and not just the idiomatic differences of the different functions.

This approach ignores the fact that many applications and operating system GUI controls perform a shared set of identical functions. For example, creating an HTML based email document using a mail composer requires essentially the same steps as creating a web page document using a web page editor, yet the two programs used to perform these tasks have distinct interfaces. The actual steps that must be performed can be very different because the graphical user interface (GUI) controls that the two programs provide are different. Likewise, accessing and reading threaded email requires essentially the same steps as accessing and reading news, yet email programs and news readers use distinct interfaces so that the actual steps involved are different. Users are required to learn how to use the different interface controls and thus, they must adapt to each different interface.

Referring to the above examples of drafting HTML based email versus creating a web page and reading threaded email versus reading news: in both of these cases, the fact that one document type is stored locally and transmitted versus the other being stored on a remote server, are the only real perceived differences. Rather than extracting these differences as attributes that the user controls in relation to their document, prior art groupware has created different, complex GUI controls and operating system concepts to which the user must adapt. In doing so, the prior art groupware has created a great deal of redundant user interface controls that the user must learn about and master, just to use the information processing system. The prior art groupware information processing systems have failed to provide a VUI that only requires the minimum set of controls.

Therefore, what is needed is an interface that is both minimal and intuitive in terms of its VUI controls, and at the same time, as universal as possible for all the different kinds of documents that are to be processed. What is further needed is an information presentation method that is not cluttered with VUI controls, but instead provides information and access to documents in a form and organization that is natural to users. In other words, what is needed is a method of providing information such that the information itself and its organization is the essential part of the visual user interface.

Even more problematic is the way in which applications use different kinds of documents. Because different applications generally store documents in the application's own unique digital format, the existing GUIs of current operating systems primarily associate documents with the application that created them, rather than the user project, user goal, user priority, or user concern to which they belong. In contrast, observation of how the system fits into user workflow in an intranet environment for example, makes it clear that users do not draw a distinction between all the various artificial boundaries that information systems impose. The fact that various objects and documents are associated with different applications and are stored in different locations simply creates obstacles that the user must overcome. Users view their desktop application files, references to people, bookmarks, and other objects as all being related to certain projects, goals, concerns, or priorities. They are merely burdened by having to be aware of the application to which the various objects relate.

For example, the Windows for Workgroups Operating System uses arbitrary three letter file name extensions to identify to the user and the system which the program is associated with a particular file. For instance, the word processor program MicroSoft Word uses the extension ".DOC"; the spreadsheet application Corel Quattro Pro uses ".WB3"; and the drawing program Visio Technical 4.0 uses the extension ".VSD". If the user fails to name the document with an extension that the operating system (OS) recognizes, the user must either manually create the association, or identify the appropriate application for the system each time the document is directly accessed. Even worse, if the user provides an incorrect extension the OS will attempt to access the file with the incorrect application. The net effect of burdening the user with awareness of the association between documents and applications is to make it easier for the user to access documents via the application instead of directly. Thus, users are motivated to group documents by application type as opposed to projects, priorities, concerns, or goals.

The same problem exists in applications directed toward communication. Users associate different people with the different projects on which they work. At any given time, users want to communicate with other users, but the interfaces to the necessary information to do so are significant obstacles. Existing information systems that provide communications facilities require the originator to provide a phone number, or an email address, or a pager number. Merely being aware of the target person's identity is insufficient. Sometimes, real time communication is desired and other times, time delayed communication is most desirable. The media chosen depends on urgency, the content of the message, the nature of the message, the time of day, and various other factors. Prior art systems do not permit easily the target person to indicate the ideal way to communicate with them. Sometimes the user initiating the communication does not care what media is used to deliver the message as long as it gets to the intended recipient. However, in every case, the goal of communicating is the same.

Existing user interfaces make it difficult for the user by segmenting the process of communicating depending on the selected media and mode. Users are burdened with, not only having to know the identity of the person with which they want to communicate, but also very specific details about the different numbers and addresses associated with that person. For instance, email has an interface that requires a target address, video conferencing has a different interface, voice mail has yet a different interface that requires a target phone number, etc. Once again the user is burdened with having to learn redundant sets of GUI controls to use the communication system. Thus, what is further needed is a universal, media independent means for providing communication facilities that present messages in a coherent cohesive manner. In addition, what is also needed is a means for communicating with other users without having to know specific details about how to contact them or even their identities. More desirably, users should be able to contact others based on common goals, concerns, priorities, or associations.

Another short fall of existing GUIs for groupware applications and network OS's is that the prior art systems are generally ignorant of time other than timestamping of files, logging system events, initiating backup subsystems, and timing out upon detecting a sustained error condition. These time related functions are essentially concerned with the system itself. In other words, events relevant to the information, as opposed to the system, are not logged for example. The needs of a work group jointly revising a document are not met. Observation of users using existing GUIs indicates that time is an essential aspect of almost all information. A document's creation or last modification date can be important information, but in a collaborative network workgroup setting, it is likely that timestamps alone, as a means of relating the document to time, will be insufficient. For example, in order to recover a version of the document as it existed before a fourth reviewer revised it but after a third modified the document requires more than mere timestamps.

In addition to not providing time-based revision control, prior art GUIs for groupware applications and OS's do not provide access to documents relevant to the current time and date. Groupware calendar time applications such as calandar by XYZ Corporation do provide time sensitive notification of events along with documents related to the triggering events. However, the calendar programs of the prior art cannot integrate the calendar function with reference to people and to information. Moreover, the calendar programs of the prior art do not permit multi-dimensional viewing of different aspects of people and of information.

Agents, such as Microsoft Agent (available from Microsoft Corporation at http://www.microsoft.com/intdev/agent/) are well known in the art. However, these are passive helpers which carry out a set of actions. They function in the background and automate a set of steps which historically requires a set of manual steps. They do not actively perform diverse steps to achieve a function.

Another significant problem with prior art GUIs exists where familiar mechanical-age models serve as more than just mere metaphors, but are actually implemented on the computer. In an effort to make the interface more familiar to users, the GUIs of the prior art provide interfaces implemented as computer versions of familiar mechanical processes using computer versions of mechanical objects. Simply put, mechanical-age processes are a lot less efficient when computerized. Usually, common procedures are easier to perform by hand than they are with computers. For example, addressing an envelope with a computer is more complex and less efficient than simply using a typewriter to perform the same task. Only when there are a large number of envelopes to address is there an efficiency benefit. Mechanical models transliterated to computers are always less efficient.

Another example of this principle is evident from a name and address list on a computer. If an address list is faithfully rendered like a small bound book, it will be much more complex, inconvenient and difficult to use than the actual book. A name and address book, for example, stores names in alphabetical order by last name. If the user wants to find someone by a first name there is a problem. The mechanical-age artifact is not helpful. Pages must be scanned manually. So, too, does the accurately rendered computerized version: it cannot be searched by first name either. The difference is that, on the computer screen, you lose many subtle visual cues offered by the paper-based book. The scrollbars and dialog boxes are harder to use, to visualize, and to understand than flipping hardcopy pages. Thus, GUI controls once again become obstacles to the user.

The usual result of a mechanical process being computerized, is that the user of that process will suffer. The only situation where transliterated processes yield an advantage is if the sheer quantity of items to be processed is large enough to justify doing the task en masse. Early data-processing systems did this with applications like invoicing and billing. Most of user computing jobs do not involve the raw processing of sufficiently large quantities of information for this to remain true.

But there is another, bigger problem with transliterated mechanical models. The old mechanical method will always have the strengths and weaknesses of its medium, like pen and paper. Software has a completely different set of strengths and weaknesses, yet when those old models are brought across without change, they combine the weaknesses of the old with the weaknesses of the new. In the address book example above, the computer could easily search for an entry by first name, but, by storing the names in the same paradigm as the mechanical artifact, new ways of searching are precluded. The user is limited to essentially that which could be done in the world of paper and ink, but now the user must do it through dialog boxes and menus. Reliance on mechanical-age paradigms, have blinded the designers of prior art GUIs to the far greater potential of the computer to do information management tasks in an improved manner.

The Windows environment can be thought of as an example of a transliterated mechanical-age artifact implemented in a computer. The paradigm is that of a desktop in which the windows are analogous to papers and books. Several distinct, but overlapping regions on a single display are rendered for processing documents. In the same way, several books and documents can occupy an actual desktop. As with an actual desktop, the windows environment can become cluttered and unmanageable. Further, a substantial burden remains on the user to keep the system organized.

Obviously, the existing windows-based environments are not strictly limited to being a mechanical artifact transliteration. As described above, the windows can be resized or reordered, and each one functions as a distinct virtual machine in that a different application can be run within each window. Additionally, a system of menus, which has no mechanical equivalent in the desktop paradigm, provides the means for performing operations. Objects such as documents, applications, and OS components are represented by icons. While the primary means of interfacing with these types of systems are the menus, there are limited visual facilities that allow operation of the system purely via manipulation of the objects themselves. For example, Apple's Macintosh System 7 and MicroSoft's Windows 95 allows the user to delete files by moving the icons representative of the files to a delete function object called "Trash" or the "Recycle Bin".

However, the tools provided by the prior art GUIs to help manage the desktop environment often aggravate the problems of the desktop paradigm. For example, in Windows 3.11, the tool provided to locate a "window" actually clutters the screen with an additional window. The pop-up window called the "task list" provides a list of open windows indexed by the particular application being used and not by the information sought. The burden is on the user to remember which application is used to access which information. The "tile" tool for automatically arranging the windows in the windows environment actually adds to the disorganization by resizing the open windows into a seemingly random arrangement of unusable small sized windows.

SUMMARY OF THE INVENTION

In accordance with the present invention, a method of interfacing a user with a computer on a display has the computer generating and displaying icons representing people, time, and information. Various functions such as composing, routing (collaborative or singularly) are provided by activating one or more of the icons.

The present invention also relates to an article of manufacture for a computer program capable of performing the foregoing method, having computer readable program code stored on a computer usable medium. Finally, the present invention also comprises a computer system having such program preloaded therein.

BRIEF DESCRIPTION OF THE DRAWINGS

FIG. 7 is an image generated by the computer program code embodied in an article of manufacture of the present invention displayed on a computer display showing the receipt of various messages.

DETAILED DESCRIPTION OF THE INVENTION

Figure 1:
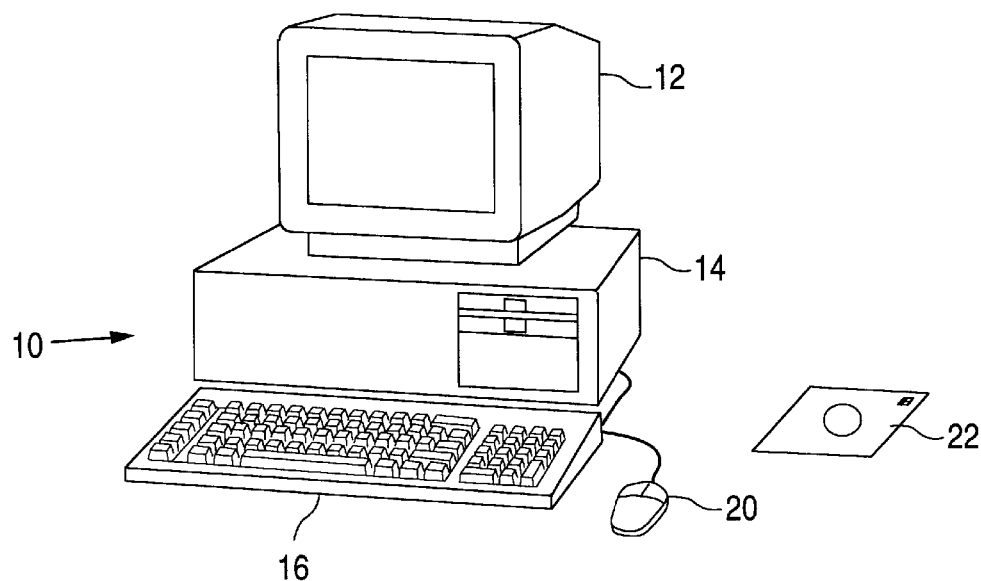
FIG. 1 is a block diagram of a computer system comprising keyboard, computer and display with a computer usable medium, such as a magnetic disk, for storing a program capable of performing the method of the present invention.

Referring to FIG. 1 there is shown generally a computer system 10 of the present invention. The computer system 10 comprises a computer display device such as a monitor 12. The system 10 also comprises a computer 14 comprising well known components such as memory, microprocessor, and hard disk drive (all of which are not shown). The system 10 need not be limited to the traditional concept of a "computer system". In fact any device, including consumer electronic devices, having a memory, a microprocessor, and a storage device is a computer system which can be used with the present invention. The hard drive or a storage device has a computer program code capable of performing the method of the present invention preloaded or stored therein. The system 10 also comprises a keyboard 16 and a pointing device 20, such as a mouse connected to the computer 14 for supplying input signals thereto. By moving the pointing device 20, a cursor shown on the monitor 12 would be moved. Further, as is well known, by clicking the mouse 20, if the cursor is position over an icon on the monitor 12, the icon over which the cursor is positioned would be selected. Alternatively, the present invention can be used with a monitor having a touch sensitive screen or a light pen, to activate portions of the selected display. Therefore, as used hereinafter, the term "cursor" shall include these alternative forms to select desired icons on the monitor 12. In addition, the present invention can also be practiced by an article of manufacture using a computer usable medium, such as a floppy disk or a CD-ROM, containing computer readable program code configured to cause the computer to perform the method of the present invention as explained hereinafter.

Figure 2A:
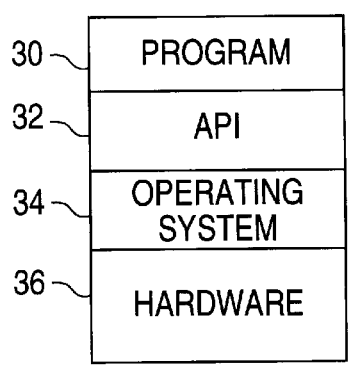
FIGS. 2(A–C) are block diagrams showing the computer program code embodied in an article of manufacture of the present invention interfacing with the hardware of a computer, in different configurations.

The system 10 of the present invention or the method of the present invention or the article of manufacture of the present invention comprise in part a computer program code 30 which interacts with the computer hardware in one of many possible ways. Referring to FIG. 2A there is shown one embodiment of the present invention wherein the computer program code 30, which is executable by the computer 14, interfaces with an application program interface (API) which interfaces with an operating system which then interfaces with the hardware of the computer such as the microprocessor, memory and the hard disk drive. The operating system 34 can comprise well known operating systems such as Microsoft DOS and Microsoft CE, both available from Microsoft Corporation, UNIX, or MacIntosh, available from Apple Computer.

Figure 2B:
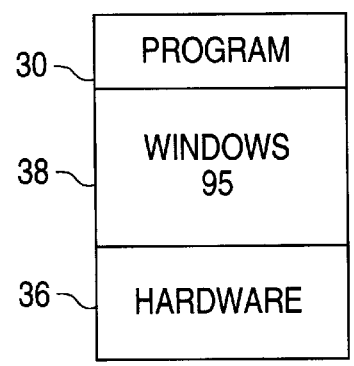
Figure 2C:
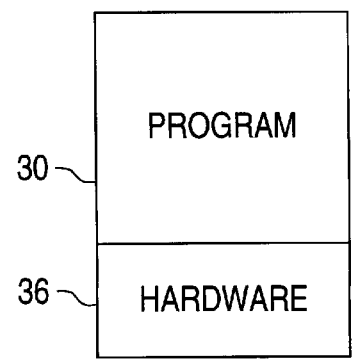

Alternatively, referring to FIG. 2B there is shown the computer program code 30 interfacing directly with an operating system such as Windows '95, available from Microsoft Corporation, without the use of the API 32. The operating system such as Windows '95, 38, interfaces directly with the hardware 36.

Finally, the computer program code 30 can also incorporate the necessary operating system elements and interfaces directly with the hardware 36. In the preferred embodiment, the computer program code 30 would be written in a language, such as JAVA (available from Sun Microsystems, Inc.) or JavaScript (available from Netscape Communications Corp.) which is hardware independent. In the preferred embodiment of the present invention, the computer program code 30 has been written in the JavaScript language and a copy thereof is attached as Appendix A.

Figure 3:
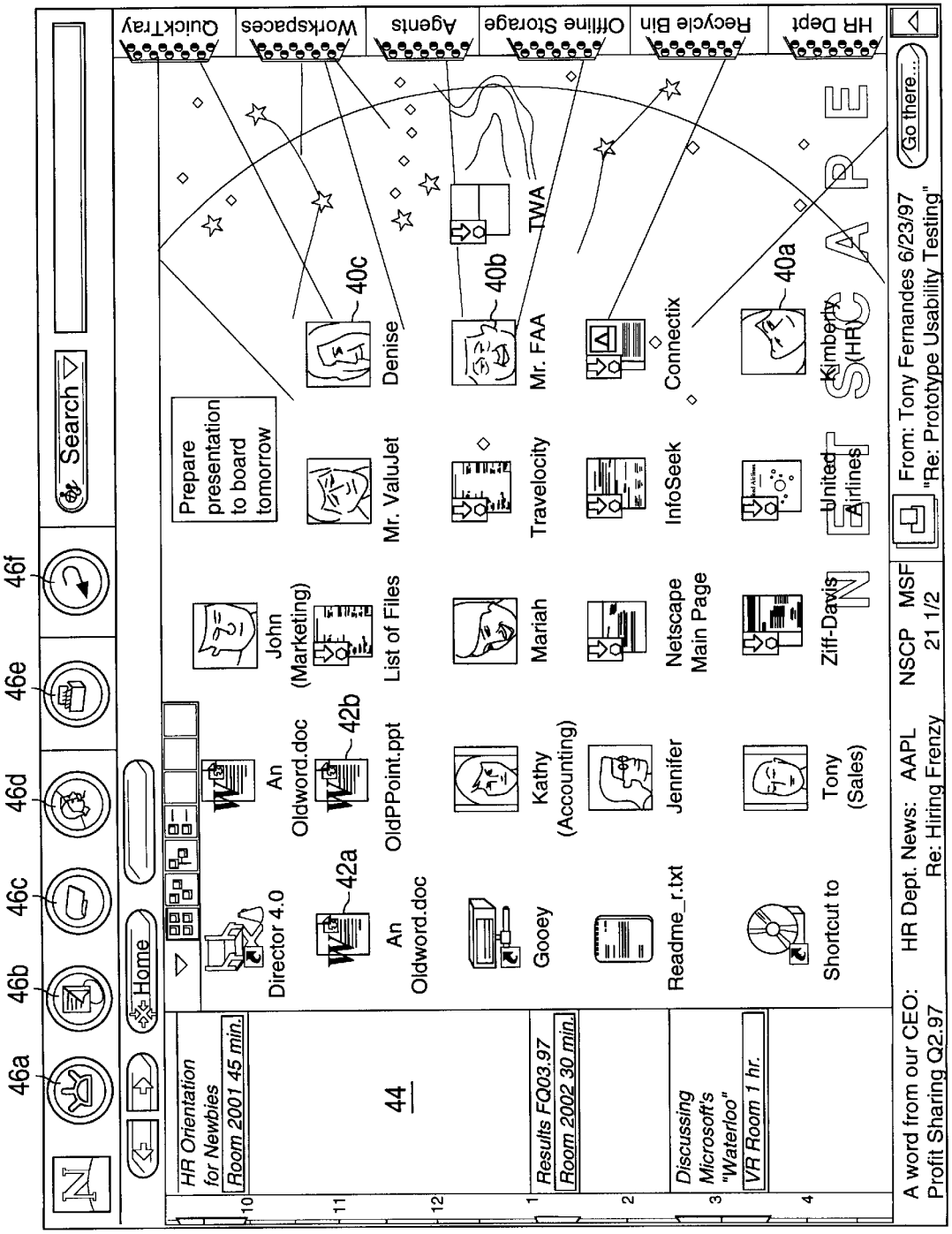
FIG. 3 is an image on a computer display generated by the computer program code embodied in an article of manufacture of the present invention showing icons representative of people, information, and time.

Referring to FIG. 3, there is shown a display 50, which is the output of the monitor 14, and which interfaces with a user. The display 50 is generated by the computer program code 30 embodied in the article of manufacture of the present invention. The display 50 has a plurality of first icons 40 (A–C). Each of the first plurality of icons is a graphical representation of an individual. Each of the first icons 40 has a set of objects, which can be inherited, if the creator of the first icon 40 so desired. Thus, for example, a first icon 40 can be from the Internet published by a user, in which the user has published his desk top view, which can be inherited, by the user of the system 10. When the user of the system 10 selects the objects associated with the selected first icon 40, which the creator of that first icon 40 has permitted to be published, the user of the system 10 will also see the desk top that the publisher created. As a result, a creator of a first icon with inheritable objects can easily maintain and update objects which are far from the publication location. Moreover, the objects created by the publisher can be inherited in part or in total. Thus, if a publisher has created a first set of objects relating to desk top, and a second set of objects relating to. favorite web sites, a user of the system 10 can choose to inherit one or both types of objects.

The display 50 also has a plurality of second icons 42 (A–B). Each of the plurality of second icons 42 is a graphical representation of information. The information can be of any type. They can include but are not limited to: spread sheet files, text files, images, sound, reference to URL sites on the Internet, etc. Finally, the display 50 has a third icon 44 which is a graphical representation of time. In addition, the display 50 comprises a number of fourth icons 46 (A–F). The fourth icon 46A is the icon of the desktop, which is activated to the display 50 shown in FIG. 3. The fourth icon 46B, when activated, is for the creation of documents representing information. The fourth icon 46C, when activated, brings up the display for an inbox containing documents received and sent by the user. The fourth icon 46D, when activated, connects the user to contact various individuals. The fourth icon 46E, when activated, permits printing. Finally, the fourth icon 46F, when activated, undoes the previous action. A number of functions will now be described with regard to the display 50.

COMPOSING

Figure 4:
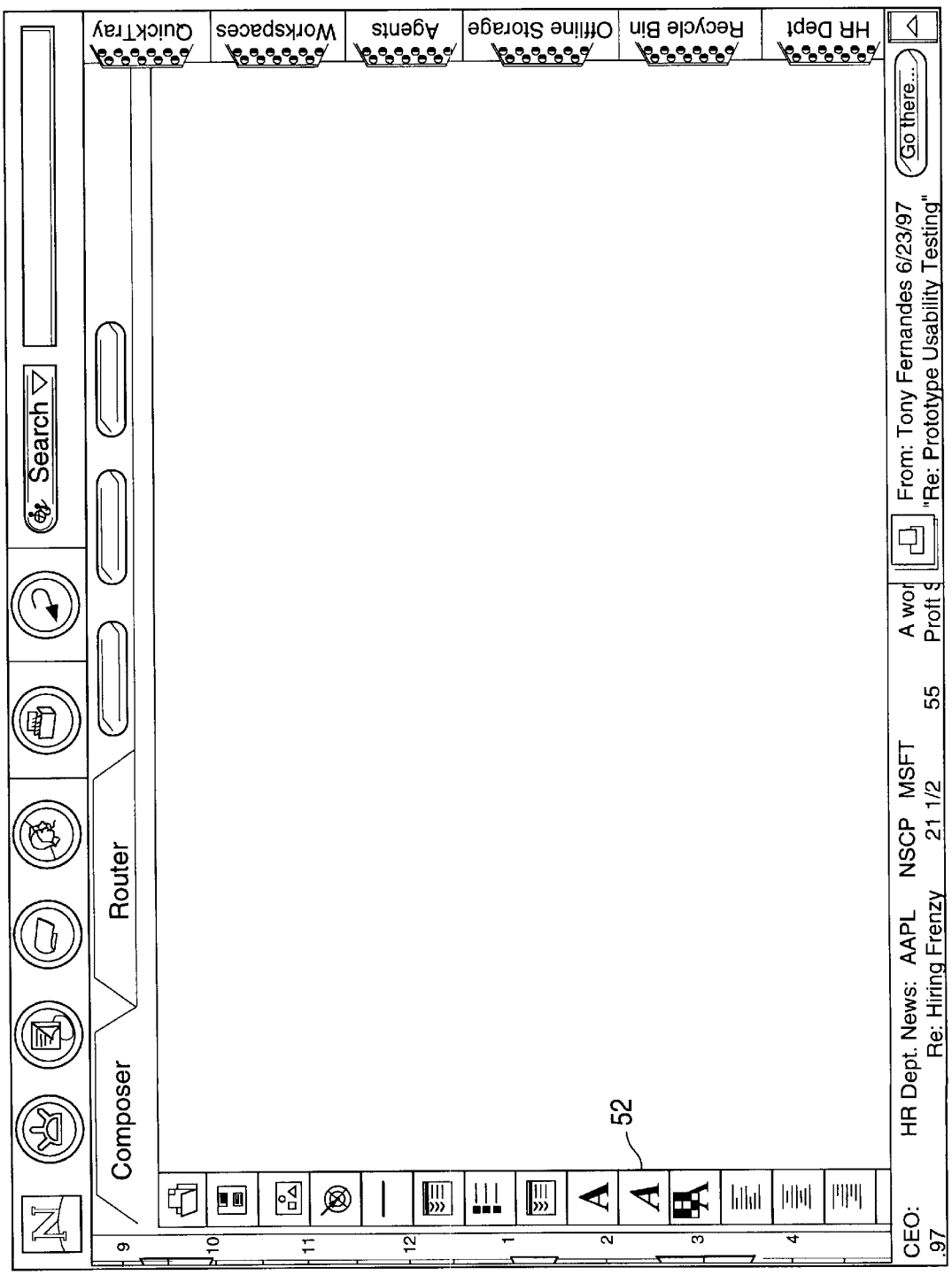
FIG. 4 is an image generated by the computer program code embodied in an article of manufacture of the present invention on a display showing the composition of a document using the method of the present invention.

When the user desires to create a document, unlike the method of the prior art, all the user has to do is to activate or click the fourth icon 46B. The intended document can be an e-mail, text, spreadsheet, database or to receive any other type of input from the user. When the fourth icon 46B is activated, the display 50 changes to the display 50 shown in FIG. 4. In FIG. 4, the display 50 shows the composition of a document. When the user desires to enter alphanumeric text, the button 52 indicated as the letter "A" is activated. The display 50 is then adapted for entering alphanumeric text for e-mail, HTML creation, word processing or the like. If the user desires to input spreadsheet-type data, a similar button (not shown) would be activated and the screen or display 50 would change into one suitable for spreadsheet data input, including borders for rows and columns. Thus, a universal data input display interface is presented.

Figure 5:
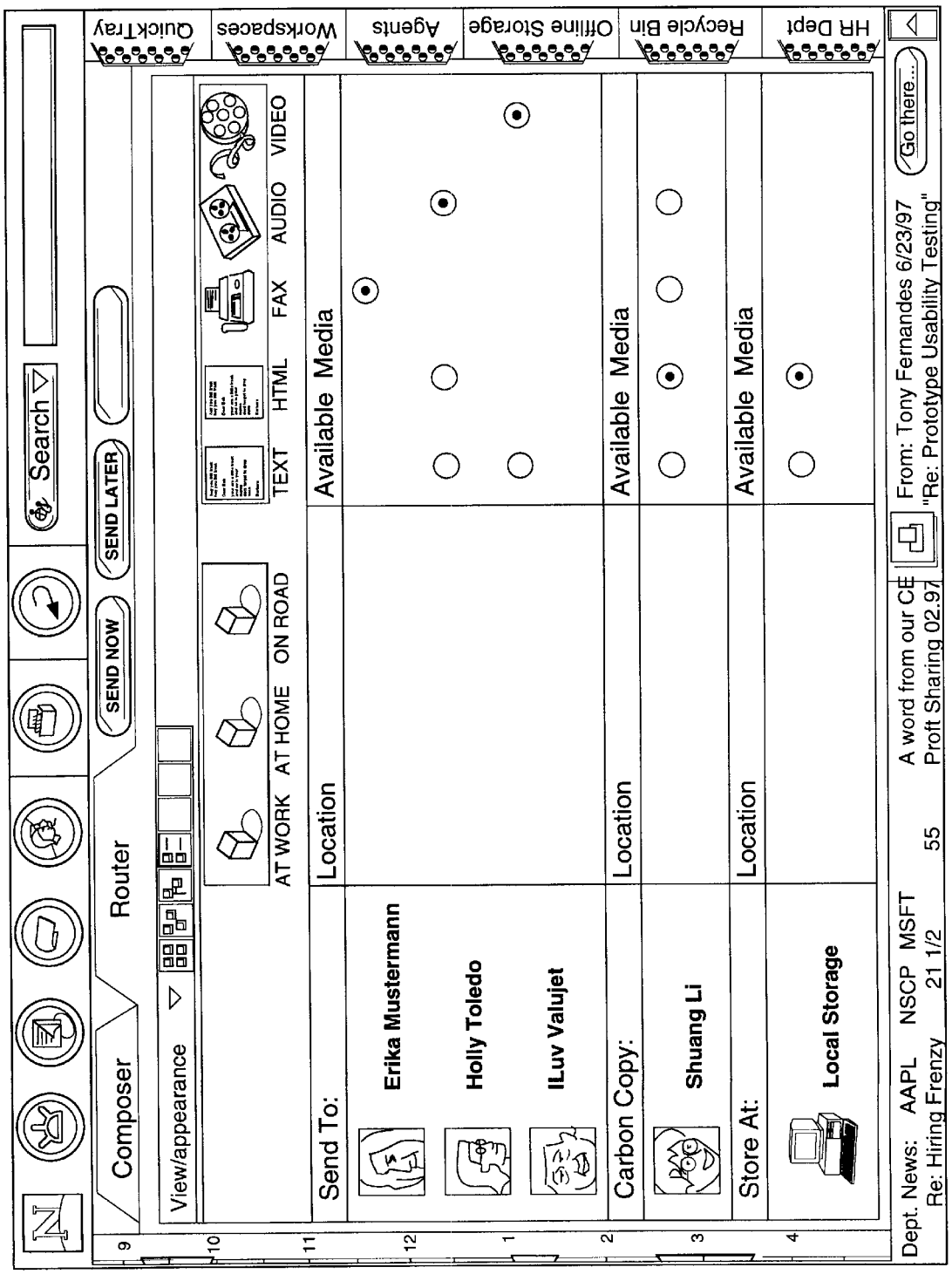
FIG. 5 is an image generated by the computer program code embodied in an article of manufacture of the present invention on a display showing the routing of created information to various individuals and the available media, for each individual.

After the information has been entered, the document can be saved, printed, and/or routed. When the "router" tab on the display 50, shown in FIG. 4, is activated, the display 50 changes to that shown in FIG. 5. FIG. 5 shows on the left hand side picture icons of individuals to send the message to or to send carbon copies to or to store the document. In addition, for each of the icons associated with the individual, there are routing options as to the location of the documents associated with each individual. Thus, each individual can specify whether he or she would receive the document "at work", or "at home", or "on road". Furthermore, each individual can specify and define the media which the individual would accept. Thus, as shown in FIG. 5, the individual labeled "Erica Mustermann" would accept the document only in facsimile format. However, it should be noted that with the method of the present invention, the user of the system does not have to thereby convert the document into facsimile format. The document created on the display 50 shown in FIG. 4 and if sent to Erica Mustermann, would automatically be converted into a facsimile format for transmission to Erica Mustermann. Similarly, for the individual labeled "Holy Toledo", who will accept documents in text or html format or audio format, the document that was composed and created on the display 50, shown in FIG. 4, would automatically be converted to any of those three media. Since Holy Toldeo would accept the document in any of the three media, the user of the system can then activate one of the buttons to choose to send the document that was just created to Holy Toledo in one of the three media defined by the individual.

Finally, of course, the user can store the document created, as shown in the display 50, shown in FIG. 5. When the document is stored, it would have an icon associated therewith such as second icon 42 (A or B) shown on the display 50 shown in FIG. 3.

ROUTING

Figure 6:
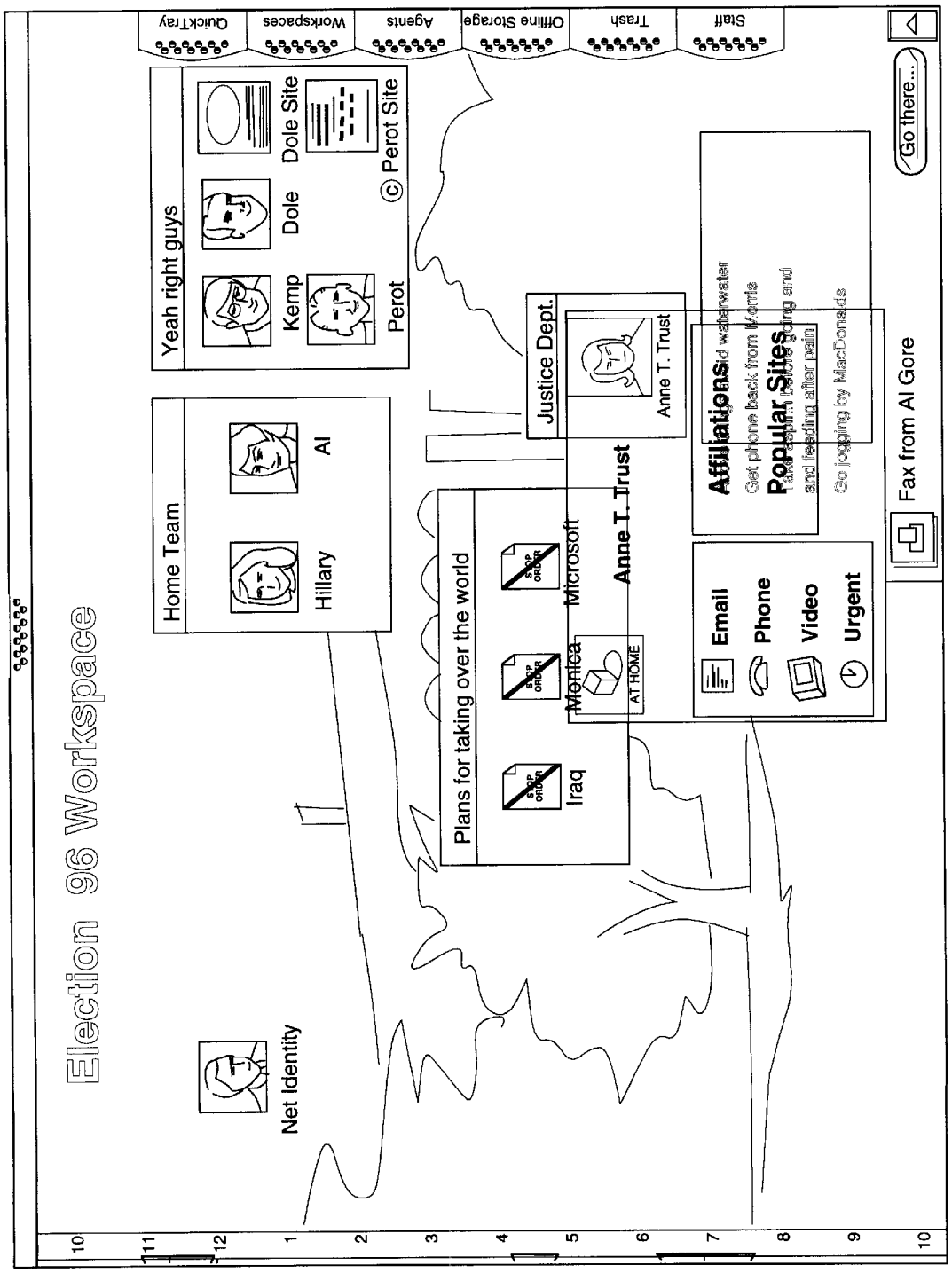
FIG. 6 is an image generated by the computer program code embodied in an article of manufacture of the present invention for display showing the routing of a stored document to an individual.

Once a document has been created and it is stored, a second icon 42 is displayed on the display 50. To route the created or stored document, such as document 42A to a desired individual, the user simply clicks or activates the desired second icon or document 42A through the use of the mouse 20. The document 42A is then dragged and superpositioned over the desired first icon 40, representative of the individual to whom the document is to be routed. Referring to FIG. 6 there is shown the display 50 showing the result of moving a document to a desired individual.

Similar to the screen 50 shown in FIG. 5 wherein for each individual there is associated the available media for communication, the display 50 shown in FIG. 6 also shows that the individual has an attribute of the delivery defined therewith. The attribute of delivery includes urgent and normal modes of delivery. Unlike the method of the prior art, however, wherein the attributes of urgent and normal modes of delivery are defined by the program that created the document or is to deliver the document, in the present invention, the attributes are defined by the individual to whom the document is to be delivered. Thus, the definition of "urgent" is specified by the individual to whom the document is to be routed. The user does not have to and in fact does not know how urgent the individual to whom the document is to be routed desires the document to be urgent format. All the user knows is that if the user believes that it is urgent, the routing thereof would be in the fastest manner specified by the individual to whom the document is intended to be routed.

TIMELINE

As previously stated, the present invention displays on the display 50 a plurality of first icons 40 representative of individuals, a plurality of second icons 42 representative of information, and a third icon 44 representative of timeline. This can be seen in FIG. 3. The interaction between the first plurality of icons 40 representative of individuals and the second plurality of icons 42 representative of information and the third icon 44 is as follows.

When a first icon 40 is selected by activating the pointing device 20, and is "dragged" until the selected first icon 40 is positioned over the third icon 44 representative of timeline, the third icon 44 would transform into a timeline showing the last communication with the individual associated with the selected desired first icon 40.

When a desired second icon 42 (representing information, such as file or reference to a location of a web site) is selected through the activation of the pointing device 20, and is "dragged" until the selected second icon 42 is positioned over the third icon 44, the third icon 44 is transformed into a timeline displaying information relative to the time of creation, reception or modification of information associated with the selected second icon 42. When the user moves the pointing device 20 to place the cursor on any of the versions of the documents so displayed on the timeline 44, and selects one of those versions, then the selected version would then be displayed on the display 50.

Finally, if no first or second icon 40 or 42 was selected prior to activating the third icon 44, then the activation of the third icon 44 would cause the third icon 44 to display information relative to the time schedule of the user. In this manner, the timeline 44 serves as a Personal Information Manager (PIM) for the user.

In addition, in the use of the third icon 44 as a PIM, one can of course, create a schedule. Furthermore, if at a particular schedule, i.e. date and time, an event (people or information) is already stored, then by clicking a desired second icon 42, and "dragging" it to that date and time, creates an association between the selected second icon 42 and the stored event or people or information.

Moreover, the information set forth in the third icon 44 can be viewed in a number of different ways. First, of course, is the conventional way of viewing all information by date and time, as a conventional scheduler. However, information can also be viewed based upon the first icon 40 or the second icon 42, i.e. information of a particular individual or subject type. Furthermore, the third icon 44 can be viewed based upon the votes returned, or the availability of people for meeting (see section entitled COLLABORATIVE ROUTING OR VOTING).

COLLABORATIVE ROUTING OR VOTING

As discussed in the background of the invention, increasingly users of a networked environment desire to share or collaborate the routing of information. Alternatively, collaborative routing can take the form of routing of information with a request to respond, i.e., through voting or otherwise.

In the present invention, collaborative routing of documents or information can be achieved in one or two ways. The user can select or activate a plurality of first icons 40 by moving the point device 20 so that the cursor on the screen 50 is placed over the desired first plurality of icons 40 and activating each one of the desired first icons 40. Thereafter, the selected first icons 40 are then moved to the desired document represented by the desired second icon 42. In this manner, the document represented by the second icon 42 is routed to the individuals represented by the plurality of first icons 40.

Alternatively, the user can first use the pointing device 20 to move the cursor means on the display 50 to select the plurality of desired first icons 40. Thereafter, the user can select the desired document 42 by moving the pointing device 20 until the cursor is placed over the desired second icon 42 and the user clicking or activating the pointing device 20. The selected second icon 42 is then moved to superposition one of the selected plurality of first icons 40. The document or information associated with the select second icon 42 is then routed to the plurality of individuals represented by the plurality of select first icons 40.

In another aspect of the present invention, if the select second icon 42 is a document which requires the selected individuals represented by the selected first plurality of icons 40 to respond, the present invention automatically and periodically notifies the selected individuals associated with the plurality of first icons 40 to remind the individuals associated with the selected plurality of first icons 40 to respond. The program 30 would also tabulate the received responses and notify the user of the tabulated result. In particular, the select second icon 42 can be an agenda agent for setting time with the individuals associated with the select first plurality of icons 40. In this manner, the program 30 can automatically send and tabulate the results of setting time with various individuals for a meeting or the like.

Alternatively, one can select the desired second icon 42, which represents information, or an action icon, which represents action, and move that to superposition over the desired one or more first icons 40 to cause information represented by the selected desired second icon 42 to be delivered to the desired one or more first icons 40 or to cause the action represented by the action icon to act on the desired one or more first icons 40.

NOTIFICATION

As discussed with regard to the display 50 shown in FIG. 5, each of the individuals representative of the first icon has an associated location or address at which information can be delivered, and the type of media which the user can receive. As part of the present invention, the user of the system 10, can likewise specify the location or address as well as the available media for the user to receive incoming e-mail, phone messages or the like when the user is not in the office. Thus, if the user is on vacation or on the road, the user can specify to the system 10 the location where the user would receive such information and the media by which the user can be accessed all similar to the display 50 shown in FIG. 5. Therefore, if for example, the user would be at a hotel location where only facsimiles can be retrieved, the user can so specify and the present invention would automatically convert each received incoming e-mail into a facsimile format document for transmission to the user at the location specified by the user.

UNIVERSAL INBOX

Referring to FIG. 7 there is shown a display 50 which is the result of the activation of the fourth icon 46C. A screen 50 showing a universal inbox is displayed. The universal inbox provides a universal way for users to deal with incoming communications that are not of an immediate nature. As a result, the user can work with the messages as a todo list. Moreover, the messages in the todo list, similar to all second icons 42 can be of any type, including but not limited to spread sheet files, text files, images, sound, reference to URL sites on the Internet, etc. The universal inbox gives the user a single place to retrieve all forms of incoming communication independent of the media. Rather than forcing people to learn a variety of interfaces for each media type, the interface is responsible for retrieving the right player for each message. Thus, if a message is received that is deemed "audio" in media, the inbox would automatically retrieve an audio player to reproduce the incoming message in an audio format. In addition, the user can specify the preferred media for retrieving the received message. Thus, if all the messages are received in text and the user prefers to receive them in audio format, all the messages can automatically converted. Finally, the universal inbox allows users to filter messages as well as to transfer them to a "to do list".

As shown in FIG. 7, when a message has been read (or heard or visually seen), the contrast is reduced and they are "dropped into the lower half" of the display 50 indicating that these are "old" messages.

Moreover, because the present invention relates to a computing device based information processing system environment that uses a visual user interface for interfacing a user with primitives of people, information and time, easy inter-relationship of these three primitives become possible. Thus, for example, an e-mail can contain an icon representative of a person (with such icon having attributes such that upon activation of that icon connection to that person is made). Upon sending or receipt of that e-mail, the received (or sent, as the case may be) icon can be moved to the third icon 44. In this manner, the icon representing the person can be entered into the time schedule represented by the third icon 44, thereby scheduling that person, in the date and time specified.

OTHER AGENTS

The present invention also contemplates the use of software agents to perform a number of tasks. These include:

I) Vacation/Out

This agent takes care of tasks related to the user leaving the office when the user is out of the office including notifying other users, having meetings scheduled, when the user is not available.

II) Valet

This agent takes care of tasks related to leaving the office with a portable computer. It operates on the basis of "packing list" that the user can specify. It retrieves information whether it is email, web pages, documents, etc. and places them on the local storage device.

III) System

This agent reports on issues related to hardware and software resources.

IV) Self Agent

This agent generates a description of the user's preferences, network identity, and how the user is media enabled.

V) Decision making

This agent helps to manage the process of driving an electronic discussion to a conclusion.

VI) Community Builder

This agent helps to find the people on the Network who's "self agents" match a set of criteria that the user specifies.

VII) Screensaver

This agent helps to retrieve the information based on the user's preferences and creates a screensaver presentation of it.

What is claimed is:

1. A method of interfacing with a computer to create and route media independent information by a user, said method comprising the steps of:

a) generating a first plurality of icons; each of said first plurality of icons is a graphical representation of an individual having an address of said individual associated therewith, and having one or more media for routing information to said individual defined by said individual;

b) displaying said first plurality of icons on a display;

c) generating a second icon; said second icon being a graphical representation for creation of information;

d) displaying said second icon on the display;

e) moving a cursor means on the display, by the user through the use of a pointing device, to activate said second icon;

f) creating information of a first media type by said user; and g) activating one of said first plurality of icons to route said information created to an individual in a media of a second media type defined by said individual, associated with a desired one of said first plurality of icons, wherein said information is automatically converted from said first media type to said second media type, if said first media type and said second media type are dissimilar.

2. The method of claim 1 further comprising the step of h) storing said information created by said user, said stored information having a third icon associated therewith, said third icon representative of information relative to said stored information associated with said second icon.

3. The method of claim 2 further comprising the step of i) selecting said third icon; and j) moving said third icon to a desired one of said first plurality of icons to route information represented by said third icon to an address of an individual in a media independent format, associated with said desired one of said first plurality of icons.

4. The method of claim 1 wherein said method is implemented by a computer program interfacing with an Application Program Interface.

5. The method of claim 4 wherein said Application Program Interface further interfaces with an operating system program.

6. The method of claim 5 wherein said operating system program is a Unix operating system program.

7. The method of claim 5 wherein said operating system program is a DOS operating system program.

8. The method of claim 5 wherein said operating system program is a MacIntosh operating system program.

9. The method of claim 1 wherein said method is implemented by a computer program interfacing directly with an operating system program.

10. The method of claim 9 wherein said operating system program is a Windows 95 operating system program.

11. The method of claim 1 wherein said method is implemented by a computer program interfacing directly with the computer hardware.

12. The method of claim 11 wherein said computer program is implemented in the JAVA or JavaScript language.

13. An article of manufacture comprising:

a computer usable medium having computer readable program code embodied therein configured to generate a user interface on a display for interfacing a user with a computer for creating and routing media independent information, the computer readable program code in said article of manufacture comprising:

computer readable program code configured to cause the computer to generate and display a first plurality of icons on the display; each of said first plurality of icons is a graphical representation of an individual having an address of said individual associated therewith, and having one or more media for routing information to said individual defined by said individual;

computer readable program code configured to cause the computer to generate and display a second icon on the display; said second icon being a graphical representation for creation of information of a first media type;

computer readable program code configured to cause the computer to respond to the user activating said second icon and to receive information created by said user; and computer readable program code configured to cause the computer to activate one of said first plurality of icons to route said information created to an individual in a media of a second media type defined by said individual, associated with a desired one of said first plurality of icons, wherein said information is automatically converted from said first media type to said second media type, if said first media type and said second media type are dissimilar.

14. The article of manufacture of claim 13 further comprising:

computer readable program code configured to cause the computer to store said information created by said user, and to generate and display a third icon associated therewith, said third icon representative of information relative to said stored information associated with said second icon.

15. The article of manufacture of claim 14 further comprising:

computer readable program code configured to cause the computer to move said third icon to a desired one of said first plurality of icons in response to user selection, and to route information represented by said third icon to an address of an individual in a media independent format, associated with said desired one of said first plurality of icons.

16. A computer system for generating a user interface on a display for interfacing a user with a computer for creating and routing media independent information, said system comprising:

a display;

a computer; and a computer usable medium having computer readable program code embodied therein, the computer readable program code comprising:

computer readable program code configured to cause the computer to generate and display a first plurality of icons on said display; each of said first plurality of icons is a graphical representation of an individual having an address of said individual associated therewith, and having one or more media for routing information to said individual defined by said individual;

computer readable program code configured to cause the computer to generate and display a second icon on said display; said second icon being a graphical representation for creation of information of a first media type;

computer readable program code configured to cause the computer to respond to the user activating said second icon and to receive information created by said user; and computer readable program code configured to cause the computer to activate one of said first plurality of icons to route said information created to an individual in a media of a second media type defined by said individual, associated with a desired one of said first plurality of icons, wherein said information is automatically converted from said first media type to said second media type, if said first media type and said second media type are dissimilar.

17. The computer system of claim 16 further comprising:

computer readable program code configured to cause the computer to store said information created by said user, and to generate and display a third icon associated therewith, said third icon representative of information relative to said stored information associated with said second icon.

18. The computer system of claim 17 further comprising:

computer readable program code configured to cause the computer to move said third icon to a desired one of said first plurality of icons in response to the user selection thereof, and to route information represented by said third icon to an address of an individual in a media independent format, associated with said desired one of said first plurality of icons.

19. A method of interfacing a user with a computer for communicating information with a select individual, said method comprising the steps of:

a) generating a first plurality of icons; each of said first plurality of icons is a graphical representation of an individual having an address of said individual associated therewith, and having a format defined by said individual;

b) displaying said first plurality of icons on a display;

c) generating a second plurality of icons; each of said second plurality of icons is a graphical representation of information;

d) displaying said second plurality of icons on the display;

e) generating a third icon, wherein said third icon is a graphical representation of time;

f) displaying said third icon on the display;

g) selecting by the user one of said second plurality of icons; and h) moving said desired one of said second plurality of icons to a desired one of said first plurality of icons to route information represented by said desired one of said second plurality of icons to an address of said select individual, in a format defined by said select individual, associated with said desired one of said first plurality of icons.

20. The method of claim 19 wherein said format includes, text, HTML, facsimile, audio, and video.

21. The method of claim 19 wherein each of said first plurality of icons has an attribute defined by said individual.

22. The method of claim 21 wherein said attribute includes urgent and normal modes of delivery.

23. The method of claim 19 wherein said method is implemented by a computer program interfacing with an Application Program Interface.

24. The method of claim 23 wherein said Application Program Interface further interfaces with an operating system program.

25. The method of claim 24 wherein said operating system program is a Unix operating system program.

26. The method of claim 24 wherein said operating system program is a DOS operating system program.

27. The method of claim 24 wherein said operating system program is a MacIntosh operating system program.

28. The method of claim 19 wherein said method is implemented by a computer program interfacing directly with an operating system program.

29. The method of claim 28 wherein said operating system program is a Windows 95 operating system program.

30. The method of claim 19 wherein said method is implemented by a computer program interfacing directly with the computer hardware.

31. The method of claim 30 wherein said computer program is implemented in the JAVA or JavaScript language.

32. An article of manufacture comprising:

a computer usable medium having computer readable program code embodied therein configured to generate a user interface on a display for interfacing a user with a computer for communicating information with a select individual, the computer readable program code in said article of manufacture comprising:

computer readable program code configured to cause the computer to generate and display a first plurality of icons on the display; each of said first plurality of icons is a graphical representation of an individual having an address of said individual associated therewith, and having a format defined by said individual;

computer readable program code configured to cause the computer to generate and display a second plurality of icons on the display; each of said second plurality of icons is a graphical representation of information;

computer readable program code configured to cause the computer to generate and display a third icon on the display, wherein said third icon is a graphical representation of time;

computer readable program code configured to cause the computer to select a desired one of said second plurality of icons in response to the user activating said desired one of said second plurality of icons; and computer readable program code configured to cause the computer to route information represented by said desired one of said second plurality of icons to an address of said select individual, in a format defined by said select individual, associated with said desired one of said first plurality of icons, in response to the user moving the desired one of said second plurality of icons to said desired one of said first plurality of icons.

33. A computer system for generating a user interface on a display for interfacing a user with a computer for communicating information with a select individual, said system comprising:

a display;

a computer; and a computer usable medium having computer readable program code embodied therein, the computer readable program code comprising:

computer readable program code configured to cause the computer to generate and display a first plurality of icons on the display; each of said first plurality of icons is a graphical representation of an individual having an address of said individual associated therewith, and having a format defined by said individual;

computer readable program code configured to cause the computer to generate and display a second plurality of icons on the display; each of said second plurality of icons is a graphical representation of information;

computer readable program code configured to cause the computer to generate and display a third icon on the display, wherein said third icon is a graphical representation of time;

computer readable program code configured to cause the computer to select a desired one of said second plurality of icons in response to the user activating said desired one of said second plurality of icons; and computer readable program code configured to cause the computer to route information represented by said desired one of said second plurality of icons to an address of said select individual, in a format defined by said select individual, associated with said desired one of said first plurality of icons, in response to the user moving the desired one of said second plurality of icons to said desired one of said first plurality of icons.

34. A method of interfacing a user with a computer, said method comprising the steps of:

a) generating a first plurality of icons; each of said first plurality of icons is a graphical representation of an individual having an address of said individual associated therewith;

b) displaying said first plurality of icons on a display;

c) generating a second plurality of icons; each of said second plurality of icons is a graphical representation of information;

d) displaying said second plurality of icons on the display;

e) generating a third icon, wherein said third icon is a graphical representation of time;

f) displaying said third icon on the display;

g) whereupon
1) selecting a desired one of said first plurality of icons by the user; and
2) activating said third icon; causes
3) displaying information relative to the time of last communication with the individual associated with said desired one of said first plurality of icons.

35. The method of claim 34 further comprising:

h) whereupon
1) selecting a desired one of said second plurality of icons by the user; and
2) activating said third icon; causes
3) displaying information relative to the time of creation, reception or modification of information associated with said desired one of said second plurality of icons.

36. The method of claim 35 further comprising:

i) whereupon
1) activating said third icon, without previously selecting one of said plurality of first icons, or one of said plurality of second icons; causes
2) displaying information relative to the time schedule of said user.

37. The method of claim 34 wherein said method is implemented by a computer program interfacing with an Application Program Interface.

38. The method of claim 37 wherein said Application Program Interface further interfaces with an operating system program.

39. The method of claim 38 wherein said operating system program is a Unix operating system program.

40. The method of claim 38 wherein said operating system program is a DOS operating system program.

41. The method of claim 38 wherein said operating system program is a MacIntosh operating system program.

42. The method of claim 34 wherein said method is implemented by a computer program interfacing directly with an operating system program.

43. The method of claim 42 wherein said operating system program is a Windows 95 operating system program.

44. The method of claim 34 wherein said method is implemented by a computer program interfacing directly with the computer hardware.

45. The method of claim 44 wherein said computer program is implemented in the JAVA or JavaScript language.

46. An article of manufacture comprising:

a computer usable medium having computer readable program code embodied therein configured to generate a user interface on a display for interfacing a user with a computer, the computer readable program code in said article of manufacture comprising:

computer readable program code configured to cause the computer to generate and display a first plurality of icons; each of said first plurality of icons is a graphical representation of an individual having an address of said individual associated therewith;

computer readable program code configured to cause the computer to generate and display a second plurality of icons; each of said second plurality of icons is a graphical representation of information;

computer readable program code configured to cause the computer to generate and display a third icon, wherein said third icon is a graphical representation of time; and computer readable program code configured to cause the computer to display information relative to the time of last communication with the individual associated with said desired one of said first plurality of icons, in response to the user selecting a desired one of said first plurality of icons and selecting said third icon.

47. The article of manufacture of claim 46 further comprising:

computer readable program code configured to cause the computer to display information relative to the time of creation, reception or modification of information associated with said desired one of said second plurality of icons in response to the user selecting a desired one of said second plurality of icons and selecting said third icon.

48. The article of manufacture of claim 47 further comprising:

computer readable program code configured to cause the computer to display information relative to the time schedule of said user, in response to the user activating said third icon, without previously selecting one of said plurality of first icons, or one of said plurality of second icons.

49. A computer system comprising:

a display;

a computer; and a computer usable medium having computer readable program code embodied therein configured to generate a user interface on a display for interfacing a user with a computer, the computer readable program code in said article of manufacture comprising:

computer readable program code configured to cause the computer to generate and display a first plurality of icons; each of said first plurality of icons is a graphical representation of an individual having an address of said individual associated therewith;

computer readable program code configured to cause the computer to generate and display a second plurality of icons; each of said second plurality of icons is a graphical representation of information;

computer readable program code configured to cause the computer to generate and display a third icon, wherein said third icon is a graphical representation of time;

computer readable program code configured to cause the computer to display information relative to the time of last communication with the individual associated with a desired one of said first plurality of icons, in response to the user selecting said desired one of said first plurality of icons, and selecting said third icon.

50. The system of claim 49 further comprising:

computer readable program code configured to cause the computer to display information relative to the time of creation, reception or modification of information associated with a desired one of said second plurality of icons, in response to the user selecting said desired one of said second plurality of icons, and selecting said third icon.

51. The system of claim 50 further comprising:

computer readable program code configured to cause the computer to display information relative to the time schedule of said user, in response to the user activating said third icon, without previously selecting one of said plurality of first icons, or one of said plurality of second icons.

52. A method of interfacing a user with a computer to communicate with a plurality of individuals, said method comprising the steps of:

a) generating a first plurality of icons; each of said first plurality of icons is a graphical representation of an individual having an address of said individual associated therewith;

b) displaying said first plurality of icons on a display;

c) generating a second icon, wherein said second icon is a graphical representation of information;

d) displaying said second icon on the display;

e) generating a third icon, wherein said third icon is a graphical representation of time;

f) displaying said third icon on the display;

g) selecting a plurality of said first plurality of icons by the user;

h) moving said selected plurality of said first plurality of icons to a said second icon to route information represented by said second icon to addresses of individuals, associated with said selected plurality of said first plurality of icons.

53. The method of claim 52 further comprising the step of:

i) automatically and periodically notifying said selected plurality of said first plurality of icons to remind said selected plurality of said first plurality of icons to respond.

54. A method of interfacing a user with a computer to communicate with a plurality of individuals, said method comprising the steps of:

a) generating a first plurality of icons; each of said first plurality of icons is a graphical representation of an individual having an address of said individual associated therewith;

b) displaying said first plurality of icons on a display;

c) generating a second icon, wherein said second icon is a graphical representation of information;

d) displaying said second icon on the display;

e) generating a third icon, wherein said third icon is a graphical representation of time;

f) displaying said third icon on the display;

g) selecting a plurality of said first plurality of icons by the user;

h) moving said selected plurality of said first plurality of icons to a said second icon to route information represented by said second icon to addresses of individuals, associated with said selected plurality of said first plurality of icons;

i) automatically and periodically notifying said selected plurality of said first plurality of icons to remind said selected plurality of said first plurality of icons to respond;

j) tabulating the received responses from said first plurality of icons; and k) notifying the user of said tabulating result.

55. The method of claim 52 wherein each of said first plurality of icons has a format defined by its associated individual.

56. The method of claim 55 wherein said format includes, text, HTML, facsimile, audio, and video.

57. The method of claim 56 wherein each of said first plurality of icons has an attribute defined by it associated individual.

58. The method of claim 57 wherein said attribute includes urgent and normal modes of delivery.

59. The method of claim 52 wherein said second icon is an agenda agent for setting time with said individuals, associated with said selected plurality of said first plurality of icons.

60. The method of claim 52 wherein said method is implemented by a computer program interfacing with an Application Program Interface.

61. The method of claim 60 wherein said Application Program Interface further interfaces with an operating system program.

62. The method of claim 61 wherein said operating system program is a Unix operating system program.

63. The method of claim 61 wherein said operating system program is a DOS operating system program.

64. The method of claim 61 wherein said operating system program is a MacIntosh operating system program.

65. The method of claim 52 wherein said method is implemented by a computer program interfacing directly with an operating system program.

66. The method of claim 65 wherein said operating system program is a Windows 95 operating system program.

67. The method of claim 52 wherein said method is implemented by a computer program interfacing directly with the computer hardware.

68. The method of claim 67 wherein said computer program is implemented in the JAVA or JavaScript language.

69. An article of manufacture comprising:

a computer usable medium having computer readable program code embodied therein configured to generate a user interface on a display for interfacing a user with a computer to communicate with a plurality of individuals, the computer readable program code in said article of manufacture comprising:

computer readable program code configured to cause the computer to generate and display a first plurality of icons on a display; each of said first plurality of icons is a graphical representation of an individual having an address of said individual associated therewith;

computer readable program code configured to cause the computer to generate and display a second icon on the display, wherein said second icon is a graphical representation of information;

computer readable program code configured to cause the computer to generate and display a third icon on the display, wherein said third icon is a graphical representation of time;

computer readable program code configured to cause the computer to select a plurality of said first plurality of icons on the display, in response to the user selecting said plurality of said first plurality of icons; and computer readable program code configured to cause the computer to route information represented by a second icon to addresses of individuals, associated with said selected plurality of said first plurality of icons, in response to the user moving said selected plurality of said first plurality of icons to said second icon.

70. The article of manufacture of claim 69 further comprising:

computer readable program code configured to cause the computer to automatically and periodically notify said selected plurality of said first plurality of icons to remind said selected plurality of said first plurality of icons to respond.

71. An article of manufacture comprising:

a computer usable medium having computer readable program code embodied therein configured to generate a user interface on a display for interfacing a user with a computer to communicate with a plurality of individuals, the computer readable program code in said article of manufacture comprising:

computer readable program code configured to cause the computer to generate and display a first plurality of icons on a display; each of said first plurality of icons is a graphical representation of an individual having an address of said individual associated therewith;

computer readable program code configured to cause the computer to generate and display a second icon on the display, wherein said second icon is a graphical representation of information;

computer readable program code configured to cause the computer to generate and display a third icon on the display, wherein said third icon is a graphical representation of time;

computer readable program code configured to cause the computer to select a plurality of said first plurality of icons on the display, in response to the user selecting said plurality of said first plurality of icons;

computer readable program code configured to cause the computer to route information represented by a second icon to addresses of individuals, associated with said selected plurality of said first plurality of icons, in response to the user moving said selected plurality of said first plurality of icons to said second icon;

computer readable program code configured to cause the computer to automatically and periodically notify said selected plurality of said first plurality of icons to remind said selected plurality of said first plurality of icons to respond; and computer readable program code configured to cause the computer to tabulate the received responses from said first plurality of icons and to notify the user of said tabulating result.

72. A computer system comprising:

a display;

a computer; and a computer usable medium having computer readable program code embodied therein configured to generate a user interface on a display for interfacing a user with a computer to communicate with a plurality of individuals, the computer readable program code in said article of manufacture comprising:

computer readable program code configured to cause the computer to generate and display a first plurality of icons on a display; each of said first plurality of icons is a graphical representation of an individual having an address of said individual associated therewith;

computer readable program code configured to cause the computer to generate and display a second icon on the display, wherein said second icon is a graphical representation of information;

computer readable program code configured to cause the computer to generate and display a third icon on the display, wherein said third icon is a graphical representation of time;

computer readable program code configured to cause the computer to select a plurality of said first plurality of icons on the display, in response to the user selecting said plurality of said first plurality of icons; and computer readable program code configured to cause the computer to route information represented by a second icon to addresses of individuals, associated with said selected plurality of said first plurality of icons, in response to the user moving said selected plurality of said first plurality of icons to said second icon, wherein said routed information is automatically converted to a respective media type defined by each of said associated individuals.

73. The computer system of claim 72 further comprising:

computer readable program code configured to cause the computer to automatically and periodically notify said selected plurality of said first plurality of icons to remind said selected plurality of said first plurality of icons to respond.

74. A computer system comprising:

a display;

a computer; and a computer usable medium having computer readable program code embodied therein configured to generate a user interface on a display for interfacing a user with a computer to communicate with a plurality of individuals, the computer readable program code in said article of manufacture comprising:

computer readable program code configured to cause the computer to generate and display a first plurality of icons on a display; each of said first plurality of icons is a graphical representation of an individual having an address of said individual associated therewith;

computer readable program code configured to cause the computer to generate and display a second icon on the display, wherein said second icon is a graphical representation of information;

computer readable program code configured to cause the computer to generate and display a third icon on the display, wherein said third icon is a graphical representation of time;

computer readable program code configured to cause the computer to select a plurality of said first plurality of icons on the display, in response to the user selecting said plurality of said first plurality of icons; and computer readable program code configured to cause the computer to route information represented by a second icon to addresses of individuals, associated with said selected plurality of said first plurality of icons, in response to the user moving said selected plurality of said first plurality of icons to said second icon;

computer readable program code configured to cause the computer to automatically and periodically notify said selected plurality of said first plurality of icons to remind said selected plurality of said first plurality of icons to respond; and computer readable program code configured to cause the computer to tabulate the received responses from said first plurality of icons and to notify the user of said tabulating result.

75. A method of interfacing a user with a computer, said method comprising the steps of:

a) generating a first plurality of icons; each of said first plurality of icons is a graphical representation of an individual, including said user; each of said first plurality of icons has an address associated therewith, and having one or more media for routing information to said individual defined by said individual;

b) displaying said first plurality of icons on a display;

c) setting the address and the media for routing information to one of said first plurality of icons, which is a graphical representation of the user;

d) receiving information by said computer; and e) routing said received information to the user at the address set by the user and via the media set by the user, wherein said routed information is automatically converted to said media type set by the user.

76. The method of claim 75 wherein said media includes, e-mail, phone and paging.

77. The method of claim 75 wherein said method is implemented by a computer program interfacing with an Application Program Interface.

78. The method of claim 77 wherein said Application Program Interface further interfaces with an operating system program.

79. The method of claim 78 wherein said operating system program is a Unix operating system program.

80. The method of claim 78 wherein said operating system program is a DOS operating system program.

81. The method of claim 78 wherein said operating system program is a MacIntosh operating system program.

82. The method of claim 75 wherein said method is implemented by a computer program interfacing directly with an operating system program.

83. The method of claim 82 wherein said operating system program is a Windows 95 operating system program.

84. The method of claim 75 wherein said method is implemented by a computer program interfacing directly with the computer hardware.

85. The method of claim 84 wherein said computer program is implemented in the JAVA or JavaScript language.

86. An article of manufacture comprising:

a computer usable medium having computer readable program code embodied therein configured to generate a user interface on a display for interfacing a user with a computer, the computer readable program code in said article of manufacture comprising:

computer readable program code configured to cause the computer to generate and display a first plurality of icons; each of said first plurality of icons is a graphical representation of an individual, including said user; each of said first plurality of icons has an address associated therewith, and having one or more media for routing information to said individual defined by said individual;

computer readable program code configured to cause the computer to set the address and the media for routing information to one of said first plurality of icons, which is a graphical representation of the user;

computer readable program code configured to cause the computer to receive information by said computer; and computer readable program code configured to cause the computer to route said received information to the user at the address set by the user and via the media set by the user, wherein said routed information is automatically converted to said media type set by the user.

87. A computer system comprising:

a display;

a computer; and a computer usable medium having computer readable program code embodied therein configured to generate a user interface on said display for interfacing a user with a computer, the computer readable program code in said article of manufacture comprising:

computer readable program code configured to cause the computer to generate and display a first plurality of icons; each of said first plurality of icons is a graphical representation of an individual, including said user; each of said first plurality of icons has an address associated therewith, and having one or more media for routing information to said individual defined by said individual;

computer readable program code configured to cause the computer to set the address and the media for routing information to one of said first plurality of icons, which is a graphical representation of the user;

computer readable program code configured to cause the computer to receive information by said computer; and computer readable program code configured to cause the computer to route said received information to the user at the address set by the user and via the media set by the user, wherein said routed information is automatically converted to said media type set by the user.

* * * * *